(12) United States Patent
Stuart et al.

(10) Patent No.: US 6,187,155 B1
(45) Date of Patent: Feb. 13, 2001

(54) ELECTROLYTIC CELL SEPARATOR ASSEMBLY

(75) Inventors: Andrew T. B. Stuart, Toronto; Raynald G. Lachance, Grand-Mere, both of (CA)

(73) Assignee: Stuart Energy Systems Inc., Ontario (CA)

( * ) Notice: Under 35 U.S.C. 154(b), the term of this patent shall be extended for 0 days.

(21) Appl. No.: 09/368,353

(22) Filed: Aug. 5, 1999

(51) Int. Cl.[7] .............................. C25B 9/00; C25C 7/00; C25D 17/00
(52) U.S. Cl. .......................... 204/254; 204/255; 204/263; 204/269; 429/34
(58) Field of Search .................................. 204/254, 257, 204/258, 269, 270, 267, 253, 255, 268, 263; 429/34, 38, 39

(56) References Cited

U.S. PATENT DOCUMENTS 6,080,290 * 6/2000 Stuart et al. .................... 204/269

* cited by examiner

Primary Examiner—Kathryn Gorgos
Assistant Examiner—Wesley A. Nicolas
(74) Attorney, Agent, or Firm—Edward Stemberger

(57) ABSTRACT

An improved electrochemical system, comprising
(a) at least two cells in parallel electrical connection to constitute at least two cell stacks, each cell defining an anolyte chamber and a catholyte chamber, and including at least an anode electrode adjacent to the anolyte chamber, and a cathode electrode adjacent to the catholyte chamber;
(b) at least one unitary one piece double electrode plate having an electrically conducting frame, the anode electrode in one of the at least two cells being supported on a first portion of the electrically conducting frame, and the cathode electrode in one of the other of the at least two cells being supported on a second portion of the electrically conducting frame spaced from the first portion;
(c) at least two single electrode plates, each single electrode plate including an electrically conducting frame for supporting an anode electrode or a cathode electrode wherein the first and second portions of the double electrode plate include at least opposed faces;
(d) a membrane separator;
(e) an anolyte chamber forming frame member formed of a compressible elastomer and a catholyte chamber forming frame member formed of a compressible elastomer within each cell, the improvement comprising wherein the membrane separator is continuous and extends across each of the at least two cells and supported between and directly by in abutment with the catholyte chamber forming frame member and the anolyte chamber forming frame member to form fluid tight seals upon assembly.

6 Claims, 6 Drawing Sheets

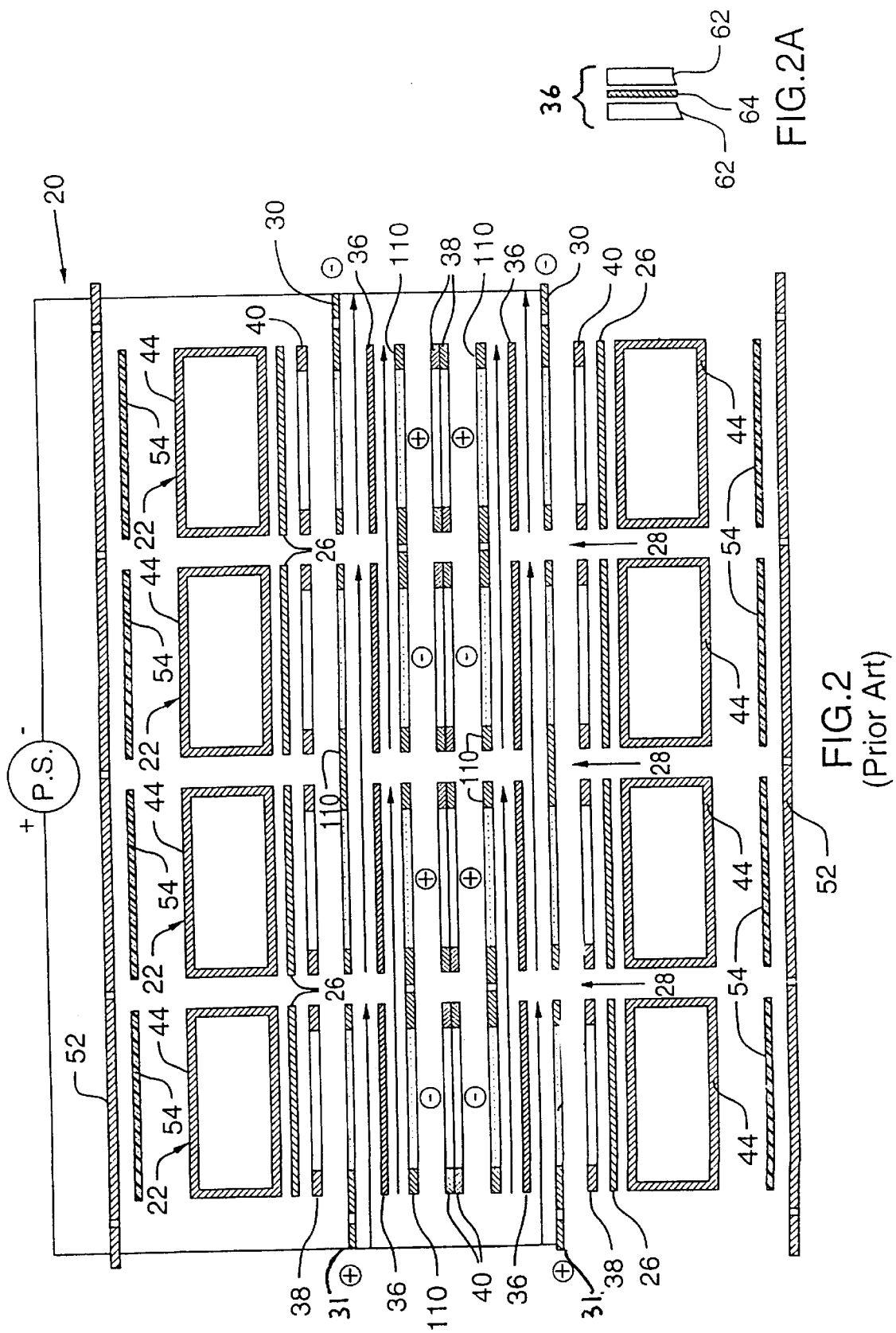

ELECTROLYTIC CELL SEPARATOR ASSEMBLY

FIELD OF THE INVENTION

This invention relates to electrolytic cells, particularly to water electrolytic cells for the production of hydrogen and oxygen having an improved separator assembly.

BACKGROUND TO THE INVENTION

Electrosynthesis is a method for production of chemical reaction(s) that is electrically driven by passage of an electric current, typically a direct current (DC), through an electrolyte between an anode electrode and a cathode electrode. An electrochemical cell is used for electrochemical reactions and comprises anode and cathode electrodes immersed in an electrolyte with the current passed between the electrodes from an external power source. The rate of production is proportional to the current flow in the absence of parasitic reactions. For example, in a liquid alkaline water electrolysis cell, the DC is passed between the two electrodes in an aqueous electrolyte to split water, the reactant, into component product gases, namely, hydrogen and oxygen where the product gases evolve at the surfaces of the respective electrodes.

Water electrolysers have typically relied on pressure control systems to control the pressure between the two halves of an electrolysis cell to insure that the two gases, namely, oxygen and hydrogen produced in the electrolytic reaction are kept separate and do not mix.

In the conventional mono-polar cell design presently in wide commercial use today, one cell or one array of (parallel) cells is contained within one functional electrolyser, or cell compartment, or individual tank. Therefore, each cell is made up of an assembly of electrode pairs in a separate tank where each assembly of electrode pairs connected in parallel acts as a single electrode pair. The connection to the cell is through a limited area contact using an interconnecting bus bar such as that disclosed in Canadian Patent No. 302,737, issued to A. T. Stuart (1930). The current is taken from a portion of a cathode in one cell to the anode of an adjacent cell using point-to-point electrical connections using the above-mentioned bus bar assembly between the cell compartments. The current is usually taken off one electrode at several points and the connection made to the next electrode at several points by means of bolting, welding or similar types of connections and each connection must be able to pass significant current densities.

Most filter press type electrolysers insulate the anodic and cathodic parts of the cell using a variety of materials that may include metals, plastics, rubbers, ceramics and various fibre based structures. In many cases, O-ring grooves are machined into frames or frames are moulded to allow O-rings to be inserted. Typically, at least two different materials form the assembly necessary to enclose the electrodes in the cell and create channels for electrolyte circulation, reactant feed and product removal.

WO98/29912, published Jul. 9, 1998, in the name The Electrolyser Corporation Ltd. and Stuart Energy Systems Inc., describes such an electrolyser system configured in either a series flow of current, single stack electrolyser (SSE) or in a parallel flow of current in a multiple stack electrolyser (MSE). Aforesaid WO98/29912 provides details of the components and assembly designs for both SSE and MSE electrolysers.

As used herein, the term "cell" or "electrochemical cell" refers to a structure comprising at least one pair of electrodes including an anode and a cathode with each being suitably supported within a cell stack configuration. The latter further comprises a series of components such as circulation frames/gaskets through which electrolyte is circulated and product is disengaged. The cell includes a separator assembly having appropriate means for sealing and mechanically supporting the separator within the enclosure and an end wall used to separate adjacent "cells". Multiple cells may be connected either in series or in parallel to form cell stacks and there is no limit on how many cells may be used to form a stack. In a stack the cells are connected in the same way, either in parallel or in series. A cell block is a unit that comprises one or more cell stacks and multiple cell blocks are connected together by an external bus bar. A functional electrolyser comprises one or more cells that are connected together either in parallel, in series, or a combination of both as detailed in PCT application WO98/29912.

Depending on the configuration of such a cell stack electrochemical system, each includes an end box at both ends of each stack in the simplest series configuration or a collection of end boxes attached at the end of each cell block. Alternative embodiments of an electrolyser includes end boxes adapted to be coupled to a horizontal header box when both a parallel and series combination of cells are assembled.

In the operation of the cell stack during electrolysis of the electrolyte, the anode serves to generate oxygen gas whereas the cathode serves to generate hydrogen gas. The two gases are kept separate and distinct by a low permeable membrane/separator. The flow of gases and electrolytes are conducted via circulation frames/gasket assemblies which also act to seal one cell component to a second and to contain the electrolyte in a cell stack configuration in analogy to a tank.

The rigid end boxes can serve several finctions including providing a return channel for electrolyte flowing out from the top of the cell in addition to serving as a gas/liquid separation device. They may also provide a location for components used for controlling the electrolyte level, i.e. liquid level sensors and temperature, i.e. for example heaters, coolers or heat exchangers. In addition, with appropriate sensors in the end boxes individual cell stack electrolyte and gas purity may be monitored. Also, while most of the electrolyte is recirculated through the electrolyser, an electrolyte stream may be taken from each end box to provide external level control, electrolyte density, temperature, cell pressure and gas purity control and monitoring. This stream would be returned to either the same end box or mixed with other similar streams and returned to the end boxes. Alternatively, probes may be inserted into the end boxes to control these parameters.

Thus, prior art cells generally comprise a plurality of planar members comprising metallic current carriers, separators, gaskets and circulation frames suitably functionally ordered, and arranged adjacently one to another in gas and electrolyte solution sealed engagement with and between the end walls of the cell(s). The non-metallic components such as the gaskets, separators and circulation frames are generally formed of compressible elastomeric materials. Assembly of the cell by compression of the cell components together provides, generally, satisfactory fluid tight seals within the cell block. In prior art cells, such as the MSE described in aforesaid WO98/29912 the cells are arranged in electrical parallel connection within each stack and series connection across adjacent stacks, wherein the metal current carriers which include the electrode members, per se, extend to the top, bottom and side edges of the cell, as do the nonmetallic components, such that the peripheries of the elastomeric and metallic planar members are coplanar.

A preferred embodiment described in aforesaid WO98/29912 comprises a four stack, two-cell double electrode plate (DEP) arrangement wherein the DEP(s) traverse two adjacent cells of a pair of stacks. Apart from the header gasket and the DEP(s), no other planar member of the aforesaid cell block extends beyond a single cell stack. Although the aforesaid monopolar electrolyser is of a compact cell design having relatively low intercell resistance factors, it is still highly desirable to further enhance the compactness and reduce the footprint and area occupied by the cell block.

SUMMARY OF THE INVENTION

It is an object of the present invention to provide an improved layout of an electrolyser which minimizes the distance between adjacent cells, reduces the voltage drop between cells and improves the electrical efficiency of the system.

It is a further object to provide a MSE electrolyser having a reduced number of component parts.

It is a yet further object of the invention to provide for easier assembly of a MSE electrolyser.

It is a yet further object to provide a safer MSE electrolyser.

In contrast to the prior art wherein the separator assembly is confined within a single cell stack, the present invention provides a MSE electrolyser system wherein the separator spans multiple cell stacks by being continuous in a single plane across the cell block and without the need for a separator support frame.

Accordingly, the invention provides in one aspect an improved electrochemical system, comprising (a) at least two cells in parallel electrical connection to constitute at least two cell stacks, each cell defining an anolyte chamber and a catholyte chamber, and including at least an anode electrode adjacent to said anolyte chamber, and a cathode electrode adjacent to said catholyte chamber;

(b) at least one unitary one piece double electrode plate having an electrically conducting frame, the anode electrode in one of said at least two cells being supported on a first portion of said electrically conducting frame, and the cathode electrode in one of the other of said at least two cells being supported on a second portion of said electrically conducting frame spaced from said first portion;

(c) at least two single electrode plates, each single electrode plate including an electrically conducting frame for supporting an anode electrode or a cathode electrode wherein the first and second portions of the double electrode plate include at least opposed faces, each of the opposed faces including a substantially planar peripheral surface extending about a periphery of the supported anode and cathode electrodes, and wherein the electrically conducting frame of the single electrode plate includes opposed faces and a planar peripheral surface on each of the opposed faces extending about a periphery of the anode or cathode supported on the single electrode plate;

(d) a separator;

(e) an anolyte chamber forming frame member formed of a compressible elastomer and a catholyte chamber forming frame member formed of a compressible elastomer within each cell, the improvement comprising wherein said separator is continuous and extends across each of said at least two cells and supported between and directly by in abutment with said catholyte chamber forming frame member and said anolyte chamber forming frame member to form fluid tight seals when said electrochemical system is assembled.

Thus, the invention provides for a volume reduction in allowing the cells to be assembled closer together in consequence of the reduction in parts; and with a concomittant improvement in efficiency.

Omission of the separator support frame may require the separator membrane per se to have fluid circulation apertures in correspondence with the respective apertures of the circulation frames to allow fluid circulation therethrough. Alternatively, the separator may be of a dimension whereby the periphery of the membrane does not extend across the apertures of the circulation frame.

The membrane material is now generally compressed to a maximum of about one fiftieth of its thickness of about 1–2 mm to about 0.025 mm when the cell components are assembled.

The absence of the membrane support frame reduces the risk of a non-constant force being applied laterally across the cell during the assembly of the cell components and, thus, reduce the risk of buckling at the peripheries through a bending moment in the stack.

Further, use of a continuous separator according to the invention obviates the need to assemble a plurality of the separator thin fabric material across the multistage assembly. Yet further, there is no need to cut, shape and assemble a plurality of individual separator assemblies within each cell stack or block.

The choice of material of construction of the separator will depend upon the electrochemical reaction taking place in the electrochemical system. For electrolysis reactions in which product gases are produced, separator 64 is a gas separator diaphragm which may or may not be a membrane. A separator which can achieve a low inter-electrode resistance factor (ohm-cm$^2$) will allow for increased current densities for a fixed cell voltage. For alkaline water electrolysis, gas separator diaphragm sheet is preferably porous and fabricated from a material such as polyphenylene sulphide or other similar electrolyte resistant materials which may be surface treated to reduce the inter-electrode resistance and reduce gas permeability. Diaphragm sheet is preferably porous for electrochemical systems used for applications in which the electrochemical reactions are prone to producing chemical gradients in the electrolyte circulation system, e.g. $H_2$ and $O_2$ in the case of water electrolysers. The porous separator diaphragm sheet permits electrolyte to cross back and forth across the membrane between the anode and cathode compartments to reduce concentration gradients but inhibits the electrochemical products produced in each compartment crossing. The use of diaphragm materials characterized by sufficient porosity to permit electrolyte mixing but prevents excessive product mixing avoids the need for special electrolyte mixing systems added on to the electrolyser. This is a significant improvement over known electrochemical systems which incorporate low porosity separators such as asbestos which require equipment to mix the anolyte and catholyte.

BRIEF DESCRIPTION OF THE DRAWINGS

In order that the invention may be better understood, preferred embodiments will now be described by way of example only, with reference to the following drawings wherein

FIG. 2 is a horizontal cross section along line 2—2 of FIG. 1 showing the electrical current path in the cell block;

FIG. 2a is a diagrammatic exploded view of separator assembly components, in part, of FIG. 2;

FIG. 3b is a view along the line 3b—3b of FIG. 3a;

DETAILED DESCRIPTION OF PREFERRED EMBODIMENTS

Figure 1:
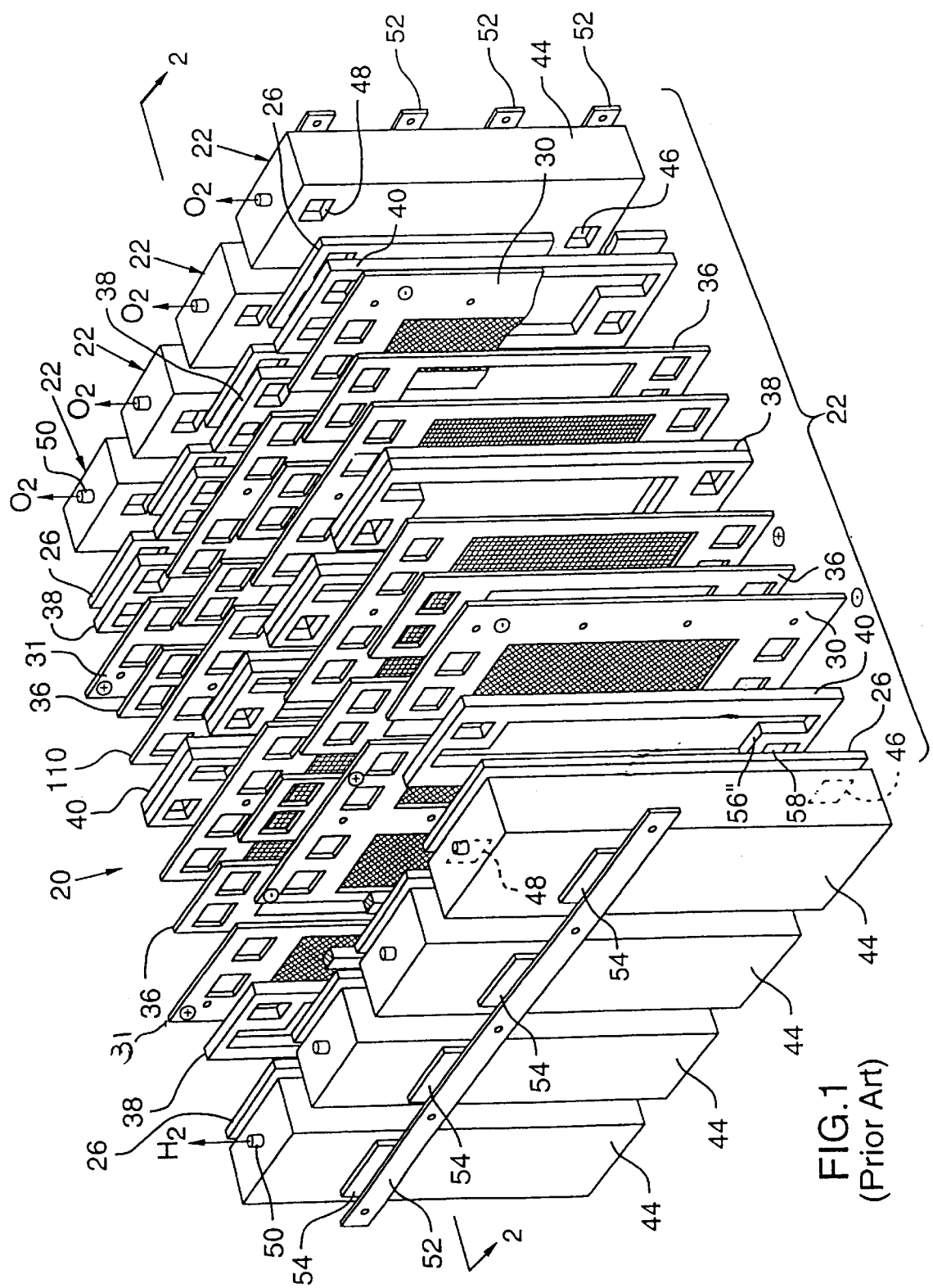
FIG. 1 is an exploded perspective view of a multi stack electrochemical system (MSE) consisting of the series connection of four stacks consisting of two cells connected in parallel, according to the prior art.

FIG. 1 shows generally as 20 a monopolar MSE according to the prior art as an embodiment in aforesaid WO98/29912.

Electrochemical system 20 is shown as a cell block comprising four cell stacks 22 with series connections between cell stacks and the two electrolysis cells of each stack connected in parallel.

Each stack 22 comprises two cells having two anodes 110 and two cathodes 30. In each compartment an anolyte frame 38 is located adjacent to anodes 110 to define an anolyte chamber and a catholyte frame 40 is located adjacent to cathodes 30 defining a catholyte chamber. Anolyte frame 38 is essentially identical in structure to catholyte frame 40 and may be generally referred to as electrolyte circulation frames.

Each anode and cathode chamber in a given cell is separated by a separator assembly 36 to reduce mixing of the different electrolysis products, namely oxygen and hydrogen, produced in the respective anode and cathode chambers.

Electrochemical system 20 includes an end box 44 at each end of each stack 22. Referring specially to FIG. 1, each end box 44 is provided with a lower aperture 46 and an upper aperture 48 in the side of the box in communication with the respective anolyte or catholyte chamber. A gas outlet 50 at the top of each box 44 provides an outlet for collecting the respective gas involved during the electrolysis reaction. Cell stacks 22 and entire cell block 20 are held together with sufficient force so that a fluid tight seal is made to prevent leaking of electrolyte or gases. The use of a rigid structural element such as a rectangular tube used to form end box 44 with clamping bars 52 and tie rods and associated fasteners (not shown) provides an even load distributing surface to seal the stacks 22 at modest clamping pressures. Electrically insulating panels 54 are sandwich between the outer surfaces of end boxes 44 and clamping bars 52 in order to prevent the end boxes from being electrically connected to each other by the clamping bars.

An insulating planar gasket 26 is disposed at the end of each stack between electrolyte frames 38 or 40 and end boxes 44 for insulating the face of end box 44 from contact with electrolyte. Gasket 26 is provided with an upper aperture and a lower aperture (not shown) in registration with apertures 48 and 46, respectively, in end box 44 for fluid circulation.

Figure 3A:
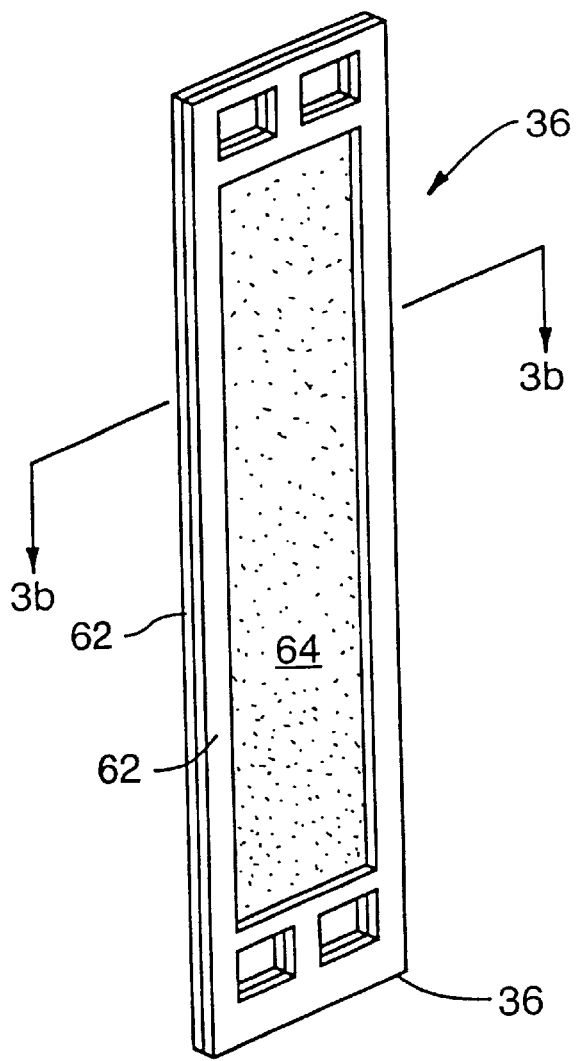
FIG. 3a is a perspective view of a gas separator assembly constructed according to the prior art.
Figure 3B:
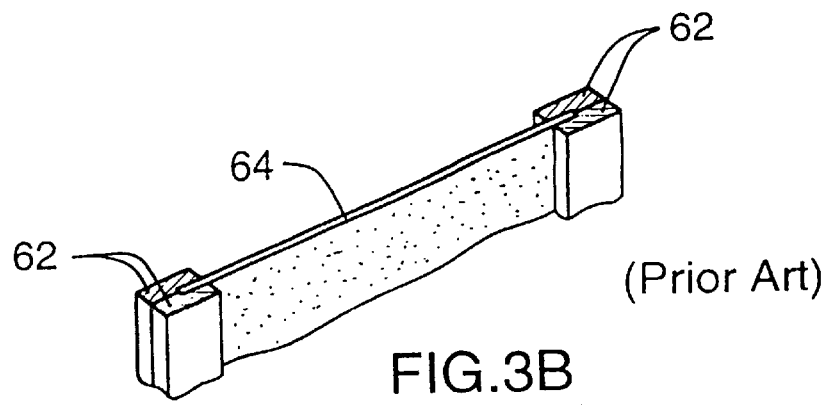

With reference also to FIGS. 2, 2a, 3a and 3b, a plurality of separator assemblies are shown as single planar member assemblies 36 in FIG. 2, but in FIGS. 2a, 3a and 3b as a three component assembly of membrane separator 64 sandwiched between a pair of separator frames 62.

Figure 4:
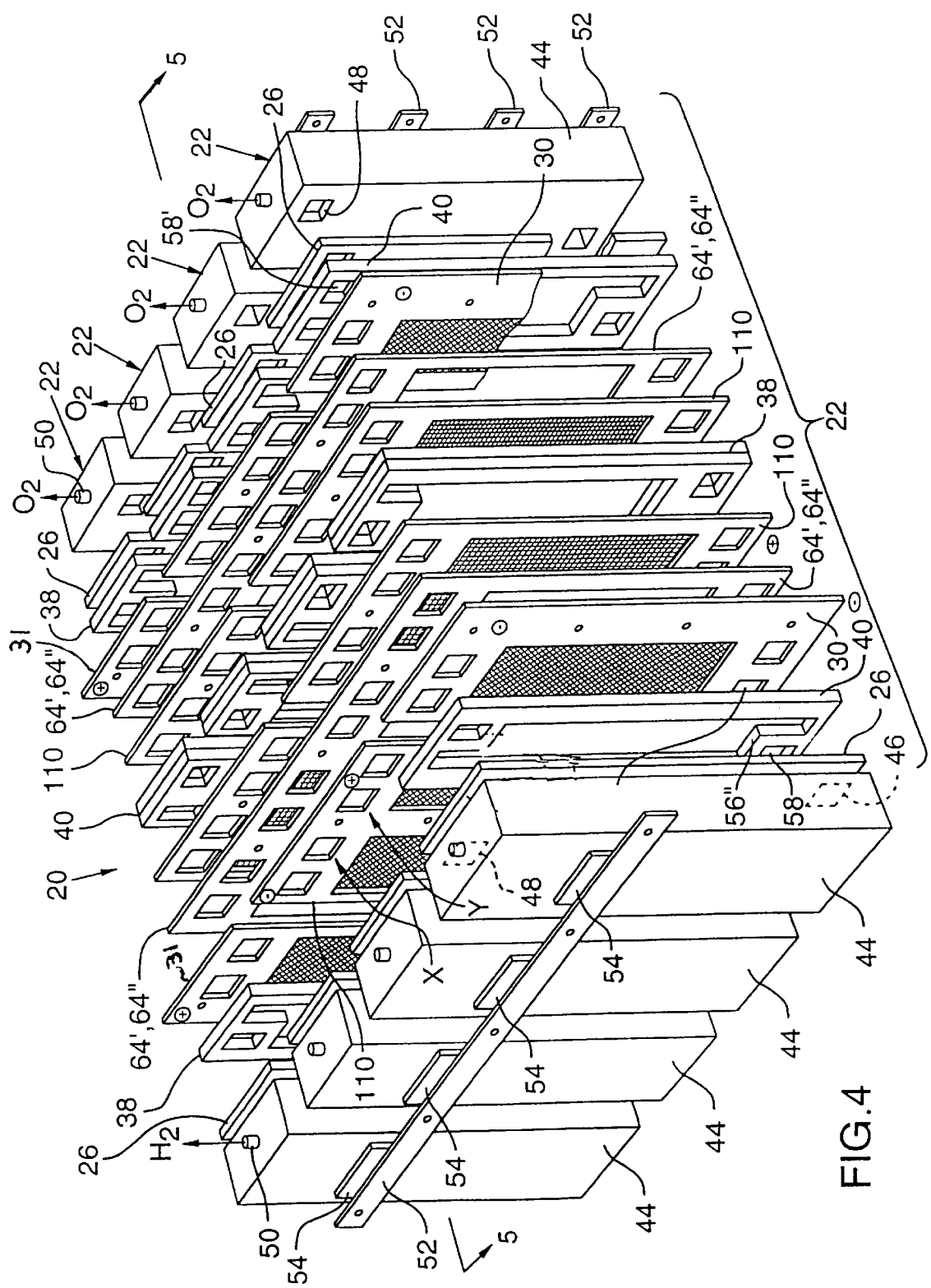
FIG. 4 is an exploded perspective view of a multi stack electrochemical system (MSE) consisting of the series connection of four stacks consisting of two cells connected in parallel, according to the present invention.
Figures 5, 5A:
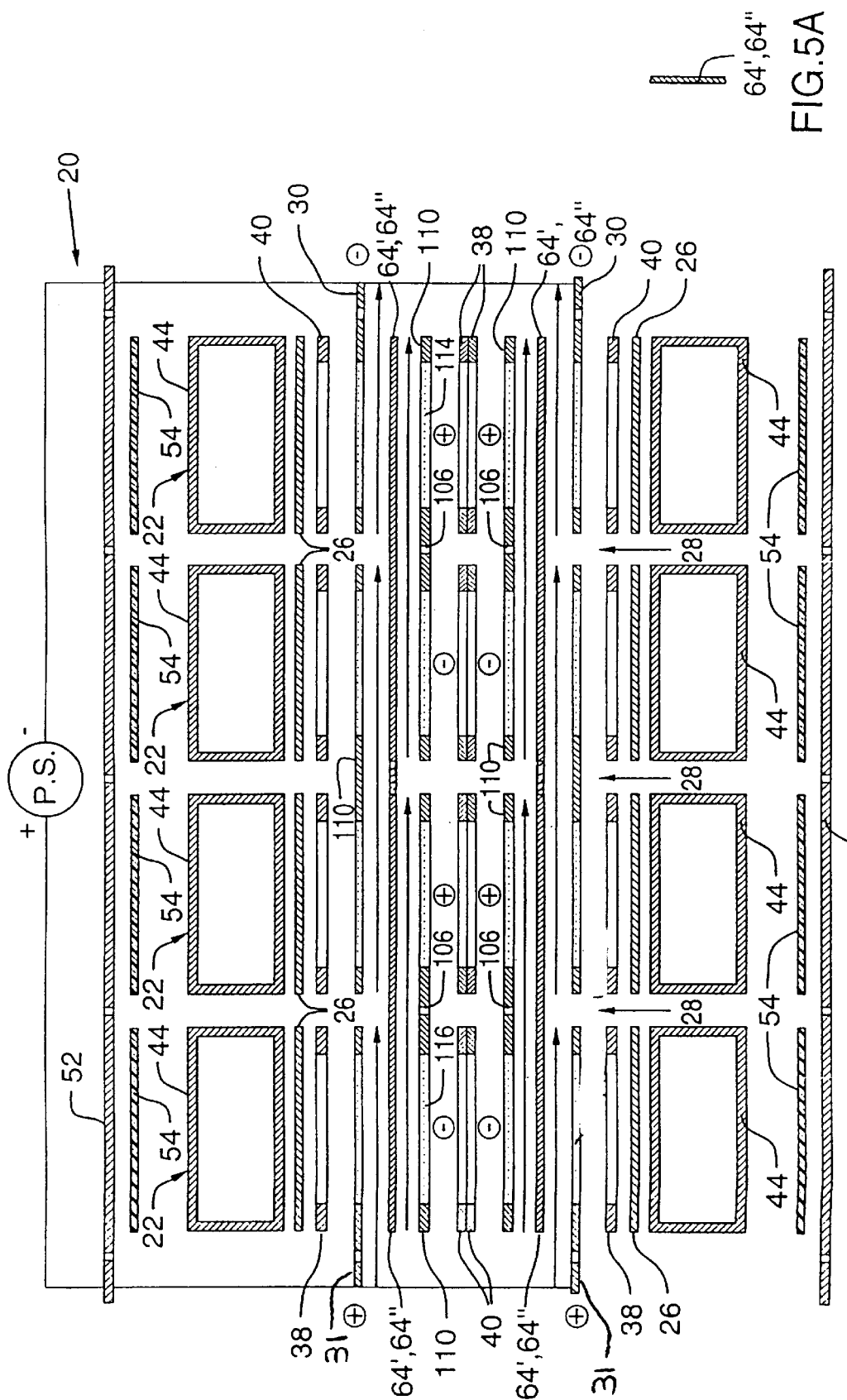
FIG. 5 is a horizontal cross section along line 5—5 of FIG. 4.
FIG. 5a is a diagrammatic view of the one continuous piece of membrane separator 64', 64"

FIGS. 4 and 5 show membrane separators 64' and 64" as continuous separators extending across the four cells of the cell stack, without use of separator frame 62.

Figure 6A:
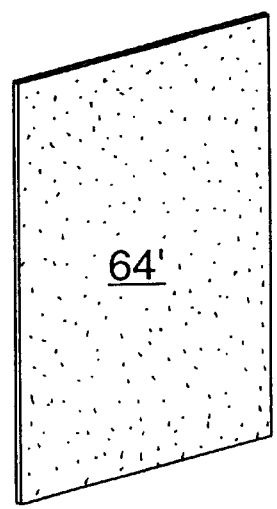
FIG. 6a is a perspective view of a continuous membrane separator of use in an electrochemical system according to the present invention.
Figure 6B:
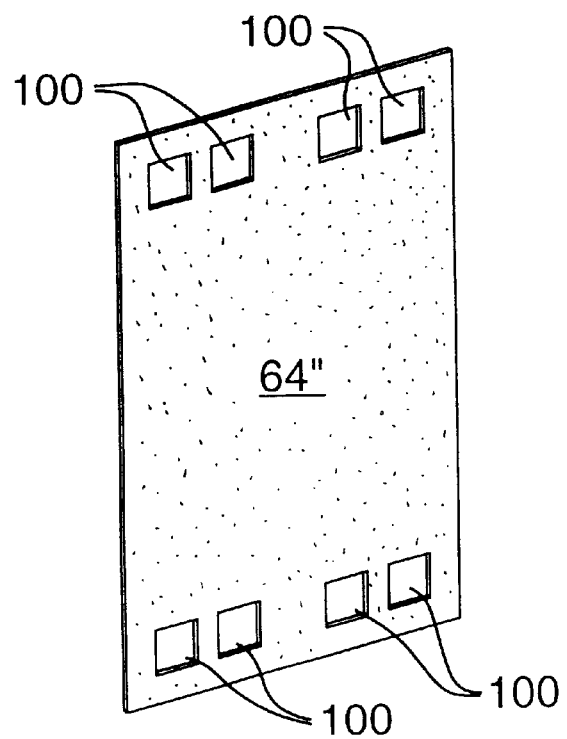
FIG. 6b is a perspective view of an alternative continuous membrane separator of use in an electrochemical system according to the present invention; and wherein the same numerals denote like parts.

FIG. 6a represents membrane separator 64' of a width and length according to the prior art; whereas 64" of FIG. 6b represents a continuous separator having portions defining electrolyte flow apertures 100 which are in register with anolyte and catholyte chamber forming members 38 and 40, respectively.

Thus, the invention eliminates the need to fabricate and use separator frames 62 and their subsequent bonding to the membrane separators 64 by utilizing a single, one continuous piece of membrane separator 64', 64" material that spans across a plurality of cell stacks when configured in a MSE electrolyser as shown in FIG. 2. The elimination of separator frames 62 permits a closer spacing between the anode 114 or cathode 116 in the double electrode plate 110 and the separator, lowering the internal cell resistance and improving the cell operating efficiency. The use of a single, one continuous piece of membrane separator aids in assembly as dimensional tolerances to fit within 62 according to the prior art are relaxed and no bonding operation is utilized.

Further, the use of a single, one continuous piece of membrane separator 64' insulates the web portion of the double electrode plate 110 between adjacent cell stacks from a user/operator standpoint, which thereby provides an element of safety via electrical insulation of the same.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. An improved electrochemical system, comprising
   (a) at least two cells in parallel electrical connection to constitute at least two cell stacks, each cell defining an anolyte chamber and a catholyte chamber, and including at least an anode electrode adjacent to said anolyte chamber, and a cathode electrode adjacent to said catholyte chamber;
   (b) at least one unitary one piece double electrode plate having an electrically conducting frame, the anode electrode in one of said at least two cells being supported on a first portion of said electrically conducting frame, and the cathode electrode in one of the other of said at least two cells being supported on a second portion of said electrically conducting frame spaced from said first portion;
   (c) at least two single electrode plates, each single electrode plate including an electrically conducting frame for supporting an anode electrode or a cathode electrode wherein the first and second portions of the double electrode plate include at least opposed faces, each of the opposed faces including a substantially planar peripheral surface extending about a periphery of the supported anode and cathode electrodes, and wherein the electrically conducting frame of the single electrode plate includes opposed faces and a planar peripheral surface on each of the opposed faces extending about a periphery of the anode or cathode supported on the single electrode plate;

(d) a membrane separator;

(e) an anolyte chamber forming frame member formed of a compressible elastomer and a catholyte chamber forming frame member formed of a compressible elastomer within each cell, the improvement comprising wherein said membrane separator is continuous and extends across each of said at least two cells and supported between and directly by in abutment with said catholyte chamber forming frame member and said anolyte chamber forming frame member to form fluid tight seals when said electrochemical system is assembled.

2. An electrochemical system according to claim 1 wherein there are n cells arranged sequentially in a single stack wherein n is an integer number of cells greater than or equal to 2 with two cells at opposed ends of said stack, wherein the electrolyser includes at least n−1 double electrode plates and two single electrode plates, wherein one of the single electrode plates supports an anode electrode and is located in the cell at one end of said stack and the other single electrode plate supports a cathode electrode and is located in said cell at the other end of said stack, and wherein each double electrode plate has said first portion located in one cell and said second portion located in an adjacent cell in said stack, and including an insulating panel sandwiched between the first and second portion of each double electrode plate.

3. An electrochemical system according to claim 2 wherein said electrically conducting frames of the double electrode plate and the single electrode plates each include at least a length and a width, said length being greater than said width, and wherein said anode and cathode electrodes supported on said single electrode plate and said double electrode plate each have a length and a width, said length being greater than said width.

4. An electrochemical system according to claim 1 wherein said electrochemical system is a multi-stack electrolyser including at least a plurality of cell stacks with opposed first and second outer cell stacks, said cell stacks being arranged substantially in parallel defining a plurality of rows of cells, wherein the cells in each stack defines a column of cells, and wherein cells in a particular row are spaced from adjacent cells in said row.

5. An electrochemical system according to claim 1 wherein said anolyte and catholyte chamber forming members have portions defining electrolyte flow passageways in registration.

6. An electrochemical system according to claim 5 further comprising said separator having portions defining electrolyte flow passageways in registration with said electrolyte flow passages of said anolyte and catholyte chamber forming members.

* * * * *